US011281039B2

(12) United States Patent
Zhou et al.

(10) Patent No.: US 11,281,039 B2
(45) Date of Patent: Mar. 22, 2022

(54) LIQUID CRYSTAL DISPLAY APPARATUS AND FINGERPRINT IDENTIFICATION METHOD FOR LIQUID CRYSTAL DISPLAY APPARATUS

(71) Applicants: Beijing BOE Optoelectronics Technology Co., Ltd., Beijing (CN); BOE Technology Group Co., Ltd., Beijing (CN)

(72) Inventors: Jinzhao Zhou, Beijing (CN); Litao Fan, Beijing (CN); Meiling Jin, Beijing (CN); Qin Xin, Beijing (CN); Zhiqiang Zhang, Beijing (CN); Jingfu Tao, Beijing (CN); Pengfei Cheng, Beijing (CN); Jian Zhang, Beijing (CN); Yujie Liu, Beijing (CN); Shubai Zhang, Beijing (CN); Haiwei Sun, Beijing (CN); Ming Zhai, Beijing (CN); Yutao Hao, Beijing (CN); Site Cai, Beijing (CN); Tingting Zhao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/896,429

(22) Filed: Jun. 9, 2020

(65) Prior Publication Data
US 2021/0191176 A1 Jun. 24, 2021

(30) Foreign Application Priority Data
Dec. 19, 2019 (CN) .......................... 201911320447.6

(51) Int. Cl.
*G02F 1/1333* (2006.01)
*G02F 1/1335* (2006.01)
(Continued)

(52) U.S. Cl.
CPC ....... *G02F 1/13338* (2013.01); *G02B 6/0068* (2013.01); *G02F 1/13394* (2013.01); *G02F 1/133536* (2013.01); *G06K 9/00013* (2013.01)

(58) Field of Classification Search
CPC ........... G02F 1/13338; G02F 1/133605; G02F 1/133536; G02F 1/133603;
(Continued)

(56) References Cited

U.S. PATENT DOCUMENTS

| 2014/0139787 A1* | 5/2014 | Ki | G02B 5/3041 |
| | | | 349/96 |
| 2015/0248033 A1* | 9/2015 | Zhu | G02F 1/133536 |
| | | | 349/57 |
| 2021/0133421 A1* | 5/2021 | Zeng | G06K 9/0004 |

FOREIGN PATENT DOCUMENTS

CN 104063704 A 9/2014

* cited by examiner

*Primary Examiner* — Angela K Davison
(74) *Attorney, Agent, or Firm* — Westman, Champlin & Koehler, P.A.

(57) ABSTRACT

A liquid crystal display apparatus is disclosed. The liquid crystal display apparatus includes: a liquid crystal display panel; an infrared transmitting reflector plate configured to transmit an infrared light and reflect a visible light; an infrared source configured to emit an infrared light which is to be transmitted through the infrared transmitting reflector plate and the liquid crystal display panel to a fingerprint to be identified on a light exit side of the liquid crystal display panel; and a fingerprint identification module disposed on the side of the infrared transmitting reflector plate facing away from the liquid crystal display panel, and configured to
(Continued)

receive a part of the infrared light emitted by the infrared source. The part of the infrared light being reflected by the fingerprint to reach the fingerprint identification module through the liquid crystal display panel and the infrared transmitting reflector plate for performing a fingerprint identification.

18 Claims, 3 Drawing Sheets

(51) Int. Cl.
 G06K 9/00 (2006.01)
 F21V 8/00 (2006.01)
 G02F 1/1339 (2006.01)
(58) Field of Classification Search
 CPC .......... G02F 1/133607; G02F 2203/11; G06K 9/00013; G06K 9/00046; G06K 21/32; G02B 5/282; G02B 5/3041; G02B 6/0073; G02B 6/0053
 See application file for complete search history.

LIQUID CRYSTAL DISPLAY APPARATUS AND FINGERPRINT IDENTIFICATION METHOD FOR LIQUID CRYSTAL DISPLAY APPARATUS

CROSS-REFERENCE TO RELATED APPLICATION

This application claims priority to Chinese Patent Application No. 201911320447.6 filed on Dec. 19, 2019, which is incorporated herein by reference in its entirety.

TECHNICAL FIELD

Embodiments of the present disclosure relate to the field of display technology, and particularly to a liquid crystal display apparatus and a fingerprint identification method for a liquid crystal display apparatus.

BACKGROUND

Usually, a fingerprint identification region is disposed outside a display area of a terminal device, such as at a back or a side of the terminal device. In this way, a user needs to move her or his finger to the fingerprint identification region outside the display area of the terminal device to perform a fingerprint identification.

SUMMARY

Embodiments of the present disclosure provide a liquid crystal display apparatus including: a liquid crystal display panel configured to display an image; an infrared transmitting reflector plate disposed on a light entry side of the liquid crystal display panel and configured to transmit an infrared light and reflect a visible light; an infrared source disposed on a side of the infrared transmitting reflector plate facing away from the liquid crystal display panel, and configured to emit an infrared light which is to be transmitted through the infrared transmitting reflector plate and the liquid crystal display panel to a fingerprint to be identified on a light exit side of the liquid crystal display panel; and a fingerprint identification module disposed on the side of the infrared transmitting reflector plate facing away from the liquid crystal display panel, and configured to receive a part of the infrared light emitted by the infrared source, the part of the infrared light being reflected by the fingerprint to reach the fingerprint identification module through the liquid crystal display panel and the infrared transmitting reflector plate for performing a fingerprint identification.

According to some embodiments of the present disclosure, the liquid crystal display apparatus further includes: an inverse prism sheet disposed between the liquid crystal display panel and the infrared transmitting reflector plate.

According to some embodiments of the present disclosure, the inverse prism sheet includes: a base sheet; and a plurality of prisms arranged on a surface of the base sheet facing towards the infrared transmitting reflector plate.

According to some embodiments of the present disclosure, the liquid crystal display apparatus further includes: a polarizing sheet bonded to a surface of the base sheet of the inverse prism sheet facing away from the plurality of prisms.

According to some embodiments of the present disclosure, the polarizing sheet is bonded directly to the surface of the base sheet of the inverse prism sheet facing away from the plurality of prisms.

According to some embodiments of the present disclosure, the liquid crystal display apparatus further includes: a light guide plate disposed on a side of the infrared transmitting reflector plate facing towards the liquid crystal display panel, wherein the inverse prism sheet and the polarizing sheet are disposed between the light guide plate and the liquid crystal display panel.

According to some embodiments of the present disclosure, the polarizing sheet includes a multilayer-film reflective polarizing sheet.

According to some embodiments of the present disclosure, in a thickness direction of the inverse prism sheet, a gap is between the light guide plate and edges of the plurality of prisms of the inverse prism sheet facing away from the base sheet.

According to some embodiments of the present disclosure, the liquid crystal display apparatus further includes: a spacer disposed between the polarizing sheet and the light guide plate and located outside the inverse prism sheet in a direction perpendicular to the thickness direction of the inverse prism sheet, so that in the thickness direction of the inverse prism sheet, the gap is between the light guide plate and the edges of the plurality of prisms of the inverse prism sheet facing away from the base sheet.

According to some embodiments of the present disclosure, the inverse prism sheet is directly adjacent to the light guide plate.

According to some embodiments of the present disclosure, the liquid crystal display apparatus further includes: a light guide plate disposed on a side of the infrared transmitting reflector plate facing towards the liquid crystal display panel, wherein the inverse prism sheet is disposed between the light guide plate and the liquid crystal display panel.

According to some embodiments of the present disclosure, in a thickness direction of the inverse prism sheet, a gap is between the light guide plate and edges of the plurality of prisms of the inverse prism sheet facing away from the base sheet.

According to some embodiments of the present disclosure, the fingerprint identification module includes: a sensing chip; and a collimating layer disposed on a side of the sensing chip facing towards the infrared transmitting reflector plate and configured to collimate the part of the infrared light which is reflected by the fingerprint to reach the fingerprint identification module through the liquid crystal display panel and the infrared transmitting reflector plate.

According to some embodiments of the present disclosure, the infrared source includes a plurality of infrared emitting elements disposed around the collimating layer.

According to some embodiments of the present disclosure, the fingerprint identification module further includes: a support disposed around the sensing chip and the collimating layer, wherein the plurality of infrared emitting elements of the infrared source are disposed on the support.

According to some embodiments of the present disclosure, the collimating layer includes a lens.

According to some embodiments of the present disclosure, the liquid crystal display panel includes: two substrates disposed opposite to each other; and a liquid crystal layer disposed between the two substrates.

According to some embodiments of the present disclosure, the liquid crystal display apparatus further includes: a light source disposed on a side of the light guide plate in a direction perpendicular to a thickness direction of the light guide plate, and configured to emit a visible light for displaying an image by the liquid crystal display panel.

Embodiments of the present disclosure further provide a fingerprint identification method for a liquid crystal display apparatus, the liquid crystal display apparatus including: a liquid crystal display panel configured to display an image; an infrared transmitting reflector plate disposed on a light entry side of the liquid crystal display panel and configured to transmit an infrared light and reflect a visible light; an infrared source disposed on a side of the infrared transmitting reflector plate facing away from the liquid crystal display panel and configured to emit an infrared light which is to be transmitted through the infrared transmitting reflector plate and the liquid crystal display panel to a fingerprint to be identified on a light exit side of the liquid crystal display panel; and a fingerprint identification module disposed on the side of the infrared transmitting reflector plate facing away from the liquid crystal display panel and configured to receive a part of the infrared light emitted by the infrared source, the part of the infrared light is reflected by the fingerprint to reach the fingerprint identification module through the liquid crystal display panel and the infrared transmitting reflector plate for performing a fingerprint identification, the method including: emitting, by the infrared source, an infrared light which is to be transmitted through the infrared transmitting reflector plate and the liquid crystal display panel to a fingerprint to be identified on a light exit side of the liquid crystal display panel; receiving, by the fingerprint identification module, a part of the infrared light emitted by the infrared source, the part of the infrared light being reflected by the fingerprint to reach the fingerprint identification module through the liquid crystal display panel and the infrared transmitting reflector plate; and analyzing, by the fingerprint identification module, the part of the infrared light to identify the fingerprint.

According to some embodiments of the present disclosure, the liquid crystal display apparatus further includes: an inverse prism sheet disposed between the liquid crystal display panel and the infrared transmitting reflector plate.

BRIEF DESCRIPTION OF THE DRAWINGS

In order to describe technical solutions in embodiments of the present disclosure or the prior art more clearly, accompanying drawings required for describing the embodiments or the prior art will be simply explained as below. Apparently, the accompanying drawings for the following description are only some embodiments of the present disclosure. Those skilled in the art could also derive other accompanying drawings from these accompanying drawings without making a creative work.

DETAILED DESCRIPTION

In order that the object, technical solutions and advantages of the present disclosure are more apparent and more readily appreciated, the present disclosure will be further described in detail in conjunction with embodiments with reference to the accompanying drawings as below.

Referring to FIGS. 1 to 7, embodiments of the present disclosure provide a liquid crystal display apparatus. The liquid crystal display apparatus includes: a liquid crystal display panel 500 configured to display an image; an infrared transmitting reflector plate 400 disposed on a light entry side of the liquid crystal display panel 500 and configured to transmit an infrared light and reflect a visible light; an infrared source 300 disposed on a side of the infrared transmitting reflector plate 400 facing away from the liquid crystal display panel 500, and configured to emit an infrared light which is to be transmitted through the infrared transmitting reflector plate 400 and the liquid crystal display panel 500 to a fingerprint to be identified on a light exit side of the liquid crystal display panel 500; and a fingerprint identification module 200 disposed on the side of the infrared transmitting reflector plate 400 facing away from the liquid crystal display panel 500, and configured to receive a part of the infrared light emitted by the infrared source 300, the part of the infrared light being reflected by the fingerprint to reach the fingerprint identification module through the liquid crystal display panel 500 and the infrared transmitting reflector plate 400 for performing a fingerprint identification.

With the liquid crystal display apparatus according to the embodiment of the present disclosure, the fingerprint identification module, the infrared source, and the infrared transmitting reflector plate are disposed between a substrate and the liquid crystal display panel. The infrared light emitted by the infrared source is sequentially transmitted through the infrared transmitting reflector plate and the liquid crystal display panel to a fingerprint to be identified. After passing through the liquid crystal display panel and the infrared transmitting reflector plate in sequence, a part of the infrared light reflected by the fingerprint is received and identified by the fingerprint identification module. Thereby, a user's fingerprint on the liquid crystal display panel is identified. In other words, the fingerprint in the display area is identified.

Referring to FIGS. 2-4 and 6 to 7, in some embodiments of the present disclosure, the liquid crystal display panel 500 includes: two substrates disposed opposite to each other; and a liquid crystal layer disposed between the two substrates.

Figure 1:
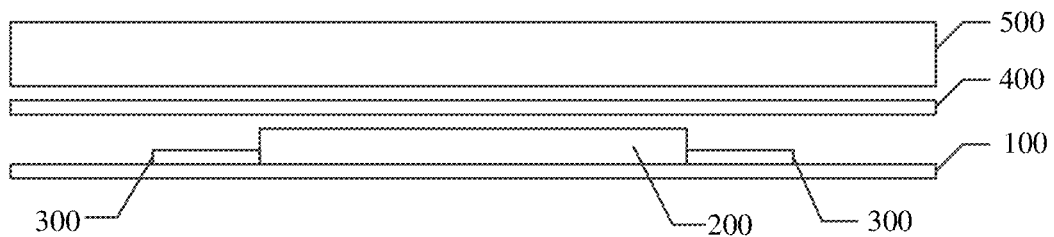
FIG. 1 is a schematic diagram showing a structure of a liquid crystal display apparatus according to an embodiment of the present disclosure.

In an example of the present disclosure, referring to FIG. 1, the liquid crystal display apparatus includes: a substrate 100, a fingerprint identification module 200, an infrared source 300, an infrared transmitting reflector plate 400, and a liquid crystal display panel 500. The fingerprint identification module 200, the infrared source 300, and the infrared transmitting reflector plate 400 are disposed between the substrate 100 and the liquid crystal display panel 500.

For example, the fingerprint identification module 200 and the infrared source 300 may be disposed on a same side of the substrate 100, the infrared transmitting reflector plate 400 may be disposed on a side of the infrared source 300 and the fingerprint identification module 200 facing away from the substrate 100, and the liquid crystal display panel 500 may be disposed on a side of the infrared transmitting reflector plate 400 facing away from the substrate 100.

In the illustrated embodiments of the present disclosure, the infrared light emitted by the infrared source 300 is sequentially transmitted through the infrared transmitting reflector plate 400 and the liquid crystal display panel 500 to a fingerprint to be identified. After passing through the liquid crystal display panel 500 and the infrared transmitting reflector plate 400 in sequence, a part of the infrared light reflected by the fingerprint is received and identified by the fingerprint identification module 200. In this way, a user's fingerprint on the liquid crystal display panel is identified. In other words, the fingerprint in the display area is identified.

For example, the infrared transmitting reflector plate 400 can transmit an infrared light which has a wavelength in an infrared waveband ranging from 800 nm to 1200 nm, and can reflect a visible light which has a wavelength in a visible waveband ranging from 380 nm to 780 nm. In this way, on the one hand, the infrared transmitting reflector plate reflects the visible light with no or little influence on a display effect of the liquid crystal display apparatus, and on the other hand, the infrared transmitting reflector plate transmits the infrared light for performing a fingerprint identification.

For example, the substrate may be a frame of a liquid crystal display screen such as a middle frame or other frames, and is not particularly limited. The infrared source may be an infrared light emitting diode. The liquid crystal display panel may be a touch liquid crystal display panel. The touch liquid crystal display panel may include a cover plate, a liquid crystal display screen, and a polarizing sheet.

Referring to FIGS. 2-4 and 6 to 7, in some embodiments of the present disclosure, the liquid crystal display apparatus further includes: an inverse prism sheet 600 disposed between the liquid crystal display panel 500 and the infrared transmitting reflector plate 400. According to an example of the present disclosure, the inverse prism sheet 600 includes: a base sheet 601; and a plurality of prisms 602 arranged on a surface of the base sheet 601 facing towards the infrared transmitting reflector plate 400.

Figure 2:
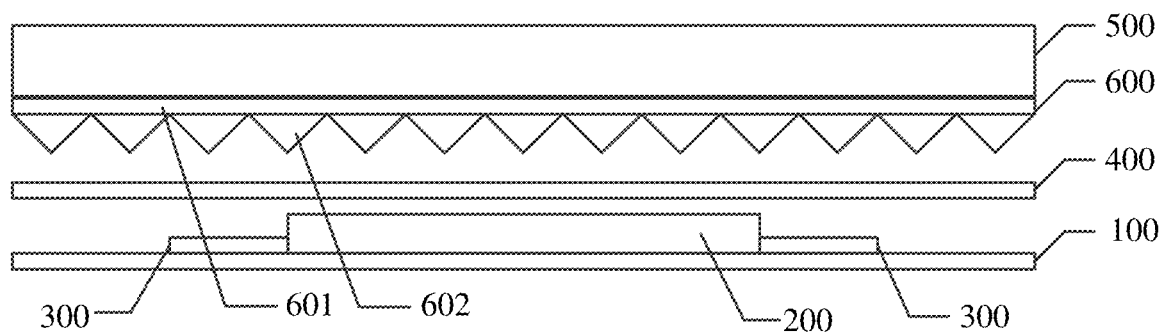
FIG. 2 is a schematic diagram showing a structure of a liquid crystal display apparatus according to another embodiment of the present disclosure.

In an embodiment, referring to FIG. 2, an inverse prism sheet 600 is further disposed on a side of the liquid crystal display panel 500 facing towards the substrate 100.

In the present embodiment, the inverse prism sheet substitutes for a structure of an upper prism sheet plus a lower prism sheet plus a diffusion sheet in a related art. Firstly, since no diffusion sheet is disposed, a stray light generated by the diffusion sheet through a disordered scatter is eliminated, which can further improve an accuracy of fingerprint identification. Secondly, a structure is simplified and a cost is reduced. Thirdly, since the inverse prism sheet has a high light transmittance, a luminance is increased.

Figure 4:
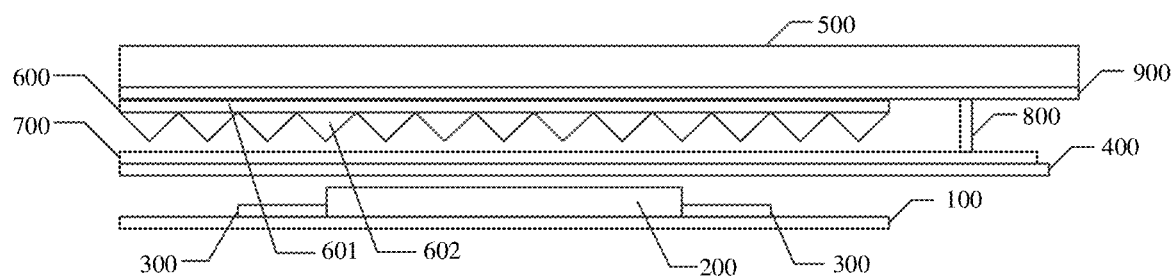
FIG. 4 is a schematic diagram showing a structure of a liquid crystal display apparatus according to yet another embodiment of the present disclosure.
Figure 7:
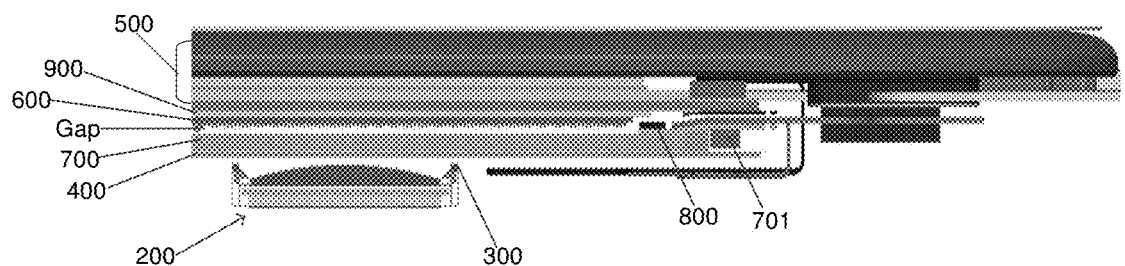
FIG. 7 is a schematic diagram showing a structure of a liquid crystal display apparatus according to another specific embodiment of the present disclosure.

Referring to FIGS. 4 and 7, in some embodiments of the present disclosure, the liquid crystal display apparatus further includes: a polarizing sheet 900 bonded to a surface of the base sheet 601 of the inverse prism sheet 600 facing away from the plurality of prisms 602. The polarizing sheet 900 may be a multilayer-film reflective polarizing sheet 900. For example, the polarizing sheet 900 is bonded directly to the surface of the base sheet 601 of the inverse prism sheet 600 facing away from the plurality of prisms 602. The polarizing sheet 900 may be bonded directly to the surface of the base sheet 601 of the inverse prism sheet 600 facing away from the plurality of prisms 602 through an optically clear adhesive. In other words, there is no other optical element between the polarizing sheet 900 and the surface of the base sheet 601 of the inverse prism sheet 600 facing away from the plurality of prisms 602.

Referring to FIGS. 4 and 7, in some embodiments of the present disclosure, the liquid crystal display apparatus further includes: a light guide plate 700 disposed on a side of the infrared transmitting reflector plate 400 facing towards the liquid crystal display panel 500. The inverse prism sheet 600 and the polarizing sheet 900 are disposed between the light guide plate 700 and the liquid crystal display panel 500. The inverse prism sheet 600 may be directly adjacent to the light guide plate 700. In other words, there may be no other optical element between the inverse prism sheet 600 and the light guide plate 700.

Referring to FIG. 7, the liquid crystal display apparatus may further include: a light source 701 disposed on a side of the light guide plate 700 in a direction perpendicular to a thickness direction of the light guide plate 700, and configured to emit a visible light for displaying an image by the liquid crystal display panel 500.

Figure 3:
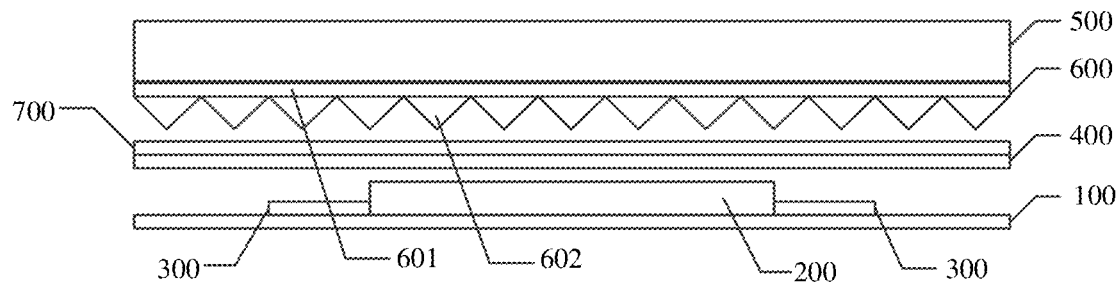
FIG. 3 is a schematic diagram showing a structure of a liquid crystal display apparatus according to still another embodiment of the present disclosure.

Referring to FIGS. 3, 4 and 7, in some embodiments of the present disclosure, in a thickness direction of the inverse prism sheet 600, a gap is formed between the light guide plate 700 and edges of the plurality of prisms 602 of the inverse prism sheet 600 facing away from the base sheet 601.

Referring to FIGS. 4 and 7, in some embodiments of the present disclosure, the liquid crystal display apparatus further includes: a spacer 800 disposed between the polarizing sheet 900 and the light guide plate 700 and located outside the inverse prism sheet 600 in a direction perpendicular to the thickness direction of the inverse prism sheet 600, so that in the thickness direction of the inverse prism sheet 600, the gap is formed between the light guide plate 700 and the edges of the plurality of prisms 602 of the inverse prism sheet 600 facing away from the base sheet 601.

Referring to FIGS. 3, 4, 6 and 7, in some embodiments of the present disclosure, the liquid crystal display apparatus further includes: a light guide plate 700 disposed on a side of the infrared transmitting reflector plate 400 facing towards the liquid crystal display panel 500. The inverse prism sheet 600 is disposed between the light guide plate 700 and the liquid crystal display panel 500. In a thickness direction of the inverse prism sheet 600, a gap is formed between the light guide plate 700 and edges of the plurality of prisms 602 of the inverse prism sheet 600 facing away from the base sheet 601.

In an embodiment, referring to FIG. 3, a light guide plate 700 is further disposed on a side of the infrared transmitting reflector plate 400 facing towards the liquid crystal display panel 500. The inverse prism sheet 600 is disposed between the light guide plate 700 and the liquid crystal display panel 500.

In an embodiment, the inverse prism sheet 600 is bonded to a polarizing sheet for the liquid crystal display panel 500. For example, the inverse prism sheet 600 may be bonded to the polarizing sheet through an optically clear adhesive. The inverse prism sheet 600 may be bonded to a polarizing sheet configured for the liquid crystal display panel 500 and located on the light entry side of the liquid crystal display panel 500. The polarizing sheet may be a multilayer-film reflective polarizing sheet (For example, made of the Advanced Polarizer Film). Alternatively, other polarizing sheets may be used. There is no particular limitation on the polarizing sheet.

In the related art, an inverse prism sheet is not bonded to a polarizing sheet on a light entry side of a liquid crystal display panel. A base material of the inverse prism sheet is soft so that the inverse prism sheet is easily deformed. An upper surface of the inverse prism sheet needs to be coated with a matte layer to reduce an adhesion between the inverse prism sheet and the polarizing sheet. However, the matte layer will reduces the luminance and thus the accuracy of fingerprint identification.

In the present embodiment, the inverse prism sheet 600 is bonded to the polarizing sheet for the liquid crystal display panel 500. It is not necessary for an upper surface (a surface bonded to the polarizing sheet) of the inverse prism sheet to be coated with a matte layer, thereby increasing the luminance and further improving the accuracy of fingerprint identification.

Referring to FIG. 4, in an embodiment, the liquid crystal display apparatus may further include a spacer 800 configured to support the inverse prism sheet 600 so that a gap is formed between the inverse prism sheet 600 and the light guide plate 700. In this way, a contact between the inverse prism sheet 600 and the light guide plate 700 can be reduced or avoided to reduce a risk that the inverse prism sheet 600 scratches the light guide plate 700.

The specific form of the spacer is not particularly limited. For example, referring to FIG. 4, the spacer 800 supports a polarizing sheet 900 configured for the liquid crystal display panel and located on the light entry side of the liquid crystal display panel, and thus supports the inverse prism sheet 600 since the polarizing sheet 900 is bonded to the inverse prism sheet 600, so that the gap is formed between the inverse prism sheet 600 and the light guide plate 700. Alternatively, the inverse prism sheet 600 may be separated from the light guide plate 700 through a plastic frame of the liquid crystal display apparatus.

Figure 5:
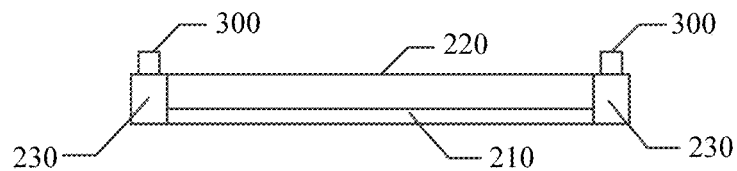
FIG. 5 is a schematic diagram showing a structure of a liquid crystal display apparatus according to a further embodiment of the present disclosure.
Figure 6:
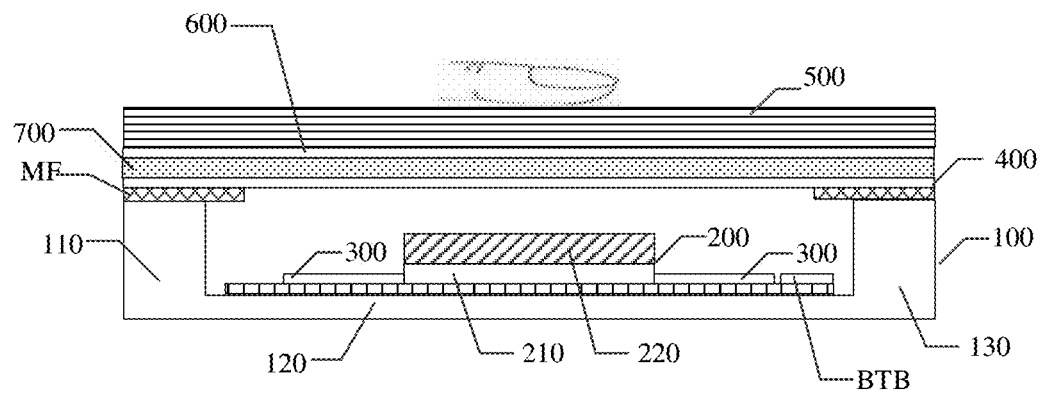
FIG. 6 is a schematic diagram showing a structure of a liquid crystal display apparatus according to a specific embodiment of the present disclosure.

Referring to FIGS. 5 and 6, in some embodiments of the present disclosure, the fingerprint identification module 200 includes: a sensing chip 210; and a collimating layer 220 disposed on a side of the sensing chip 210 facing towards the infrared transmitting reflector plate 400 and configured to collimate the part of the infrared light which is reflected by the fingerprint to reach the fingerprint identification module 200 through the liquid crystal display panel 500 and the infrared transmitting reflector plate 400. The infrared source 300 may include a plurality of infrared emitting elements disposed around the collimating layer 220. The fingerprint identification module 200 may further include: a support 230 disposed around the sensing chip 210 and the collimating layer 220. The plurality of infrared emitting elements of the infrared source 300 are disposed on the support 230. The collimating layer 220 may be a lens.

In an embodiment, referring to FIG. 5, the fingerprint identification module 200 includes: a sensing chip 210 disposed on a side of the substrate 100; a collimating layer 220 disposed on a side of the sensing chip 210 facing away from the substrate 100; and a support 230 disposed around the sensing chip 210 and the collimating layer 220. The infrared source 300 is disposed on the support 230. The infrared source 300 surrounds the collimating layer 220.

For example, the fingerprint identification module 200 may be fixed to the substrate 100 through a DAF (Die Attach Film). Alternatively, the fingerprint identification module 200 may be fixed to the substrate 100 through other optical adhesives such as an optically clear adhesive (OCA), polyvinyl butyral (PVB). There is no particular limitation on the fixation of the fingerprint identification module. the collimating layer may be a lens for converting light into collimated light, or the collimating layer may also be other devices. There is no particular limitation on the collimating layer.

In the present embodiment, with the collimated infrared fingerprint identification solution, a size of the collimating layer can be set according to a size of a region of a screen where a fingerprint identification needs to be performed. In the present embodiment, the fingerprint identification can be realized in a region of the screen having a large area.

A specific embodiment will be described as below with reference to FIG. 6.

A liquid crystal display apparatus includes: a frame (i.e. a substrate 100), a flexible printed circuit (FPC) board, a light emitting diode (LED) (i.e. an infrared source 300), a fingerprint identification module 200 (including a sensor and a collimating layer), an infrared transmitting reflector plate 400, a light guide plate (LGP) 700, an inverse prism sheet 600, and a touch liquid crystal display panel 500, which are stacked.

The substrate 100 includes three portions, i.e., a first portion 110, a second portion 120, and a third portion 130. The flexible printed circuit (FPC) board is disposed on the second portion 120, and the first portion 110 and the third portion 130 support the infrared transmitting reflector plate 400. According to an example of the present disclosure, a metal frame (MF) or a frame of any other material may be disposed between the first and third portions 110 and 130 and the infrared transmitting reflector plate 400. There is no particular limitation on the frame.

In addition, the flexible printed circuit (FPC) board may be provided with a BTB (Board To Board) connector for connecting other circuit boards or circuit cards.

In the present embodiment, the touch liquid crystal display apparatus includes the touch liquid crystal display panel, the inverse prism sheet, the light guide plate and the infrared transmitting reflector plate. The collimating layer may be adhered to the infrared sensor, and the infrared light emitting diodes are located outside the collimating layer. In other words, the infrared light emitting diodes surround the collimating layer. The collimating layer, the infrared sensor, and the infrared light emitting diodes are located under the infrared transmitting reflector plate.

An infrared light emitted by the infrared light emitting diodes is transmitted through the infrared transmitting reflector plate, the light guide plate, the inverse prism sheet and the touch liquid crystal display panel to a fingerprint to be identified. After passing through the touch liquid crystal display panel, the inverse prism sheet, the light guide plate and the infrared transmitting reflector plate in sequence, a part of the infrared light reflected by the fingerprint reaches the infrared sensor after decreasing in crosstalk through the collimating layer. The infrared sensor identifies the fingerprint based on the reflected part of the infrared light.

In the present embodiment, each layer of the liquid crystal display apparatus has a good infrared transmissivity. The polarizing sheet for the touch liquid crystal display panel polarizes only the visible light and has little influence on the infrared light, the light guide plate also has little influence on the infrared light, and the infrared transmitting reflector plate has a good infrared transmissivity. Therefore, a loss of a part of the infrared light reflected by a fingerprint to be identified is reduced, thereby improving the accuracy of fingerprint identification.

In the present embodiment, with the collimated infrared fingerprint identification solution, a size of the collimating layer can be set according to a size of a region of a screen where a fingerprint identification needs to be performed. In the present embodiment, the fingerprint identification can be realized in a region of the screen having a large area.

According to the embodiments of the present disclosure, firstly, each layer of the liquid crystal display apparatus has good infrared transmissivity. The infrared light emitted by the infrared source is sequentially transmitted through the infrared transmitting reflector plate and the liquid crystal display panel to a fingerprint to be identified. After passing through the liquid crystal display panel and the infrared transmitting reflector plate in sequence, a part of the infrared light reflected by the fingerprint is received and identified by the fingerprint identification module. In this way, a solution of identifying a fingerprint on a liquid crystal display screen is provided. Secondly, the inverse prism sheet substitutes for a structure of an upper prism sheet plus a lower prism sheet plus a diffusion sheet in a related art. Therefore, a stray light generated by the diffusion sheet through a disordered scatter is reduced, which can further improve the accuracy of fingerprint identification, and the structure is simplified and the cost is reduced, and the luminance is increased since the inverse prism sheet has a high light transmittance. Thirdly, the inverse prism sheet 600 is bonded to the polarizing sheet for the liquid crystal display panel 500. It is not necessary for an upper surface (a surface bonded to the polarizing sheet) of the inverse prism sheet to be coated with a matte layer, thereby increasing the luminance and further improving the accuracy of fingerprint identification. Fourthly, the gap is formed between the inverse prism sheet 600 and the light guide plate 700, thereby reducing or avoiding a contact between the inverse prism sheet 600 and the light guide plate 700 to reduce a risk that the inverse prism sheet 600 scratches the light guide plate 700. Fifthly, with the embodiments of the present disclosure, a cost of fingerprint identification in a screen is reduced since the liquid crystal display apparatus has a lower cost than an organic light emitting diode display apparatus.

A specific embodiment will be described as below with reference to FIG. 7.

A liquid crystal display apparatus includes: a substrate 100 (not shown in FIG. 7), an infrared source 300, a fingerprint identification module 200, an infrared transmitting reflector plate 400, a light guide plate 700, an inverse prism sheet 600, a polarizing sheet 900, and a liquid crystal display panel 500, which are stacked.

In the present embodiment, the spacer 800 supports the polarizing sheet 900 for the liquid crystal display panel, and thus supports the inverse prism sheet 600 since the polarizing sheet 900 is bonded to the inverse prism sheet 600, so that the gap is formed between the inverse prism sheet 600 and the light guide plate 700, thereby reducing the risk that the inverse prism sheet 600 scratches the light guide plate 700.

In the present embodiment, the light guide plate 700 and the infrared transmitting reflector plate 400 constitute a backlight unit.

According to the embodiments of the present disclosure, firstly, each layer of the liquid crystal display apparatus has good infrared transmissivity. The infrared light emitted by the infrared source is sequentially transmitted through the infrared transmitting reflector plate and the liquid crystal display panel to a fingerprint to be identified. After passing through the liquid crystal display panel and the infrared transmitting reflector plate in sequence, a part of the infrared light reflected by the fingerprint is received and identified by the fingerprint identification module. In this way, a solution of identifying a fingerprint on a liquid crystal display screen is provided. Secondly, the inverse prism sheet substitutes for a structure of an upper prism sheet plus a lower prism sheet plus a diffusion sheet in a related art. Therefore, a stray light generated by the diffusion sheet through a disordered scatter is reduced, which can further improve the accuracy of fingerprint identification, and the structure is simplified and the cost is reduced, and the luminance is increased since the inverse prism sheet has a high light transmittance. Thirdly, the inverse prism sheet 600 is bonded to the polarizing sheet for the liquid crystal display panel 500. It is not necessary for an upper surface (a surface bonded to the polarizing sheet) of the inverse prism sheet to be coated with a matte layer, thereby increasing the luminance and further improving the accuracy of fingerprint identification. Fourthly, the gap is formed between the inverse prism sheet 600 and the light guide plate 700, thereby reducing or avoiding a contact between the inverse prism sheet 600 and the light guide plate 700 to reduce a risk that the inverse prism sheet 600 scratches the light guide plate 700. Fifthly, with the embodiments of the present disclosure, a cost of fingerprint identification in a screen is reduced since the liquid crystal display apparatus has a lower cost than an organic light emitting diode display apparatus.

Figure 8:
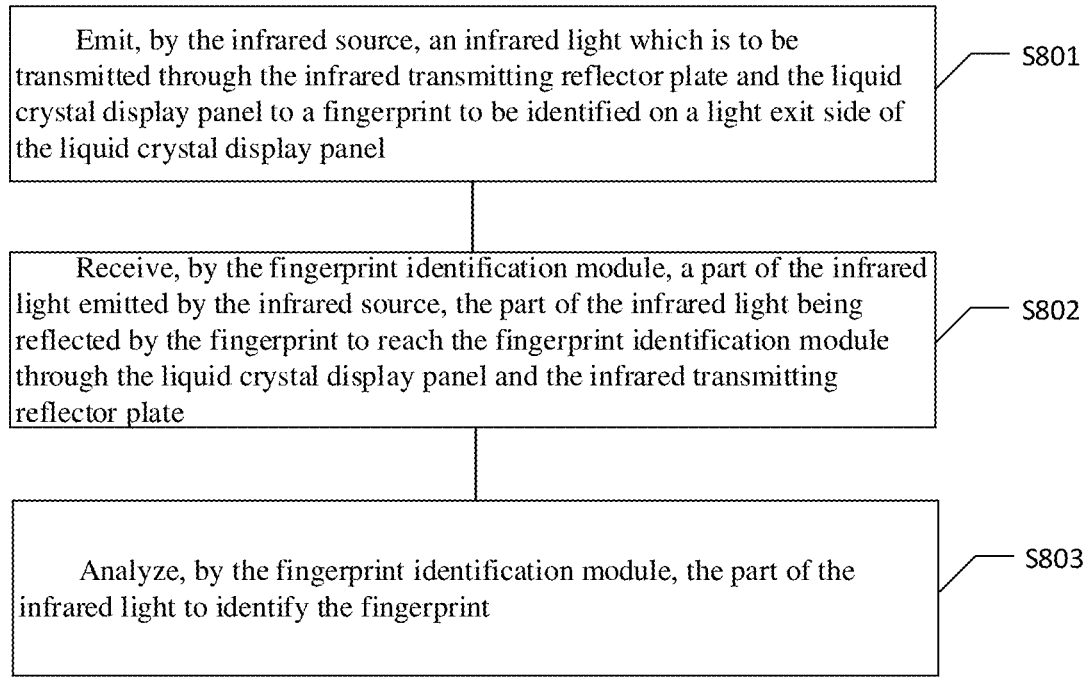
FIG. 8 is a schematic flow diagram of a fingerprint identification method for a liquid crystal display apparatus according to an embodiment of the present disclosure.

Embodiments of the present disclosure further provide a fingerprint identification method for a liquid crystal display apparatus. The liquid crystal display apparatus includes: a liquid crystal display panel 500 configured to display an image; an infrared transmitting reflector plate 400 disposed on a light entry side of the liquid crystal display panel 500 and configured to transmit an infrared light and reflect a visible light; an infrared source 300 disposed on a side of the infrared transmitting reflector plate 400 facing away from the liquid crystal display panel 500, and configured to emit an infrared light which is to be transmitted through the infrared transmitting reflector plate 400 and the liquid crystal display panel 500 to a fingerprint to be identified on a light exit side of the liquid crystal display panel 500; and a fingerprint identification module 200 disposed on the side of the infrared transmitting reflector plate 400 facing away from the liquid crystal display panel 500, and configured to receive a part of the infrared light emitted by the infrared source 300, the part of the infrared light being reflected by the fingerprint to reach the fingerprint identification module through the liquid crystal display panel 500 and the infrared transmitting reflector plate 400 for performing a fingerprint identification. The method includes: a step S801 of emitting, by the infrared source 300, an infrared light which is to be transmitted through the infrared transmitting reflector plate 400 and the liquid crystal display panel 500 to a fingerprint to be identified on a light exit side of the liquid crystal display panel 500; a step S802 of receiving, by the fingerprint identification module 200, a part of the infrared light emitted by the infrared source 300, the part of the infrared light being reflected by the fingerprint to reach the fingerprint identification module 200 through the liquid crystal display panel 500 and the infrared transmitting reflector plate 400; and a step S803 of analyzing, by the fingerprint identification module 200, the part of the infrared light to identify the fingerprint. In accordance with an example of the present disclosure, there is provided a fingerprint identification method for a liquid crystal display apparatus. The fingerprint identification module, the infrared source, and the infrared transmitting reflector plate are disposed between the substrate and the liquid crystal display panel of the liquid crystal display apparatus. As shown in FIG. 8, the method may include:

emitting an infrared light by the infrared source, wherein the infrared light is sequentially transmitted through the infrared transmitting reflector plate and the liquid crystal display panel to a fingerprint to be identified, and after passing through the liquid crystal display panel and the infrared transmitting reflector plate in sequence, a part of the infrared light reflected by the fingerprint reaches the fingerprint identification module; and receiving and analyzing, by the fingerprint identification module, the part of the infrared light reflected by the fingerprint, to identify the fingerprint.

For example, the infrared transmitting reflector plate can transmit an infrared light which has a wavelength in an infrared waveband ranging from 800 nm to 1200 nm, and can reflect a visible light which has a wavelength in a visible waveband ranging from 380 nm to 780 nm. In this way, on the one hand, the infrared transmitting reflector plate reflects the visible light with no or little influence on a display effect of the liquid crystal display apparatus, and on the other hand, the infrared transmitting reflector plate transmits the infrared light for performing a fingerprint identification.

The fingerprint identification module may include a sensing chip and a collimating layer. The sensing chip may be configured to analyze the infrared light to acquire information of the fingerprint. The collimating layer may be a lens for converting the light into collimated light to reduce a crosstalk. Alternatively, the collimating layer may also be other devices. There is no particular limitation on the collimating layer.

In the illustrated embodiments of the present disclosure, the infrared light emitted by the infrared source is sequentially transmitted through the infrared transmitting reflector plate and the liquid crystal display panel to a fingerprint to be identified. After passing through the liquid crystal display panel and the infrared transmitting reflector plate in sequence, a part of the infrared light reflected by the fingerprint is received and identified by the fingerprint identification module. In this way, a user's fingerprint on the liquid crystal display panel is identified. In other words, the fingerprint in the display area is identified.

Those of ordinary skill in the art should understand that the discussion of any of the above embodiments is merely exemplary, and is not intended to imply that the scope of the present disclosure is limited to these examples. The embodiments of the present disclosure or the features in the embodiments of the present disclosure may be combined with one another to obtain new embodiments unless they conflict. The steps in the embodiments of the present disclosure can be implemented in any order. Furthermore, there are many other variations of the disclosure as described above, which are not provided in the details for the sake of brevity.

The present disclosure is intended to cover all such substitutions, modifications, and variations that fall within the broad scope of the appended claims. Therefore, all of omissions, modifications, equivalent substitutions and improvements made without departing from the principles and spirit of the present disclosure should fall within the protection scope of the present disclosure.

What is claimed is:

1. A liquid crystal display apparatus comprising:
   a liquid crystal display panel configured to display an image;
   an infrared transmitting reflector plate disposed on a light entry side of the liquid crystal display panel and configured to transmit an infrared light and reflect a visible light;
   an infrared source disposed on a side of the infrared transmitting reflector plate facing away from the liquid crystal display panel and configured to emit an infrared light which is to be transmitted through the infrared transmitting reflector plate and the liquid crystal display panel to a fingerprint to be identified on a light exit side of the liquid crystal display panel; and
   a fingerprint identification module disposed on the side of the infrared transmitting reflector plate facing away from the liquid crystal display panel, and configured to receive a part of the infrared light emitted by the infrared source, the part of the infrared light being reflected by the fingerprint to reach the fingerprint identification module through the liquid crystal display panel and the infrared transmitting reflector plate for performing a fingerprint identification,
   wherein the fingerprint identification module comprises;
   a sensing chip; and
   a collimating layer disposed on a side of the sensing chip facing towards the infrared transmitting reflector plate and configured to collimate the part of the infrared light which is reflected by the fingerprint to reach the fingerprint identification module through the liquid crystal display panel and the infrared transmitting reflector plate,
   wherein the infrared source comprises a plurality of infrared emitting elements disposed around the collimating layer.

2. The liquid crystal display apparatus of claim 1, wherein:
   the fingerprint identification module further comprises:
   a support disposed around the sensing chip and the collimating layer, wherein the plurality of infrared emitting elements of the infrared source are disposed on the support.

3. The liquid crystal display apparatus of claim 1, wherein:
   the collimating layer comprises a lens.

4. The liquid crystal display apparatus of claim 1, wherein:
   the liquid crystal display panel comprises: two substrates disposed opposite to each other; and a liquid crystal layer disposed between the two substrates.

5. The liquid crystal display apparatus of claim 1, further comprising:
   an inverse prism sheet disposed between the liquid crystal display panel and the infrared transmitting reflector plate.

6. The liquid crystal display apparatus of claim 5, wherein:
   the inverse prism sheet comprises: a base sheet; and a plurality of prisms arranged on a surface of the base sheet facing towards the infrared transmitting reflector plate.

7. The liquid crystal display apparatus of claim 6, further comprising:
   a polarizing sheet bonded to a surface of the base sheet of the inverse prism sheet facing away from the plurality of prisms.

8. The liquid crystal display apparatus of claim 7, wherein:
   the polarizing sheet is bonded directly to the surface of the base sheet of the inverse prism sheet facing away from the plurality of prisms.

9. The liquid crystal display apparatus of claim 7, wherein:
the polarizing sheet comprises a multilayer-film reflective polarizing sheet.

10. The liquid crystal display apparatus of claim 6, further comprising:
a light guide plate disposed on a side of the infrared transmitting reflector plate facing towards the liquid crystal display panel,
wherein the inverse prism sheet is disposed between the light guide plate and the liquid crystal display panel.

11. The liquid crystal display apparatus of claim 10, wherein:
in a thickness direction of the inverse prism sheet, a gap is between the light guide plate and edges of the plurality of prisms of the inverse prism sheet facing away from the base sheet.

12. The liquid crystal display apparatus of claim 7, further comprising:
a light guide plate disposed on a side of the infrared transmitting reflector plate facing towards the liquid crystal display panel,
wherein the inverse prism sheet and the polarizing sheet are disposed between the light guide plate and the liquid crystal display panel.

13. The liquid crystal display apparatus of claim 12, wherein:
in a thickness direction of the inverse prism sheet, a gap is between the light guide plate and edges of the plurality of prisms of the inverse prism sheet facing away from the base sheet.

14. The liquid crystal display apparatus of claim 13, further comprising:
a spacer disposed between the polarizing sheet and the light guide plate and located outside the inverse prism sheet in a direction perpendicular to the thickness direction of the inverse prism sheet, so that in the thickness direction of the inverse prism sheet, the gap is between the light guide plate and the edges of the plurality of prisms of the inverse prism sheet facing away from the base sheet.

15. The liquid crystal display apparatus of claim 12, wherein:
the inverse prism sheet is directly adjacent to the light guide plate.

16. The liquid crystal display apparatus of claim 12, further comprising:
a light source disposed on a side of the light guide plate in a direction perpendicular to a thickness direction of the light guide plate, and configured to emit a visible light for displaying an image by the liquid crystal display panel.

17. A fingerprint identification method for a liquid crystal display apparatus, the liquid crystal display apparatus comprising:
a liquid crystal display panel configured to display an image;
an infrared transmitting reflector plate disposed on a light incidence side of the liquid crystal display panel and configured to transmit an infrared light and reflect a visible light;
an infrared source disposed on a side of the infrared transmitting reflector plate facing away from the liquid crystal display panel, and configured to emit an infrared light which is to be transmitted through the infrared transmitting reflector plate and the liquid crystal display panel to a fingerprint to be identified on a light exit side of the liquid crystal display panel; and
a fingerprint identification module disposed on the side of the infrared transmitting reflector plate facing away from the liquid crystal display panel and configured to receive a part of the infrared light emitted by the infrared source, the part of the infrared light is reflected by the fingerprint to reach the fingerprint identification module through the liquid crystal display panel and the infrared transmitting reflector plate for performing a fingerprint identification,
wherein the fingerprint identification module comprises:
a sensing chip; and
a collimating layer disposed on a side of the sensing chip facing towards the infrared transmitting reflector plate and configured to collimate the part of the infrared light which is reflected by the fingerprint to reach the fingerprint identification module through the liquid crystal display panel and the infrared transmitting reflector plate,
wherein the infrared source comprises a plurality of infrared emitting elements disposed around the collimating layer,
the method comprising:
emitting, by the infrared source, an infrared light which is to be transmitted through the infrared transmitting reflector plate and the liquid crystal display panel to a fingerprint to be identified on a light exit side of the liquid crystal display panel;
receiving, by the fingerprint identification module, a part of the infrared light emitted by the infrared source, the part of the infrared light being reflected by the fingerprint to reach the fingerprint identification module through the liquid crystal display panel and the infrared transmitting reflector plate; and
analyzing, by the fingerprint identification module, the part of the infrared light to identify the fingerprint.

18. The fingerprint identification method of claim 17, wherein:
the liquid crystal display apparatus further comprises:
an inverse prism sheet disposed between the liquid crystal display panel and the infrared transmitting reflector plate.

* * * * *